Patented Aug. 24, 1926.

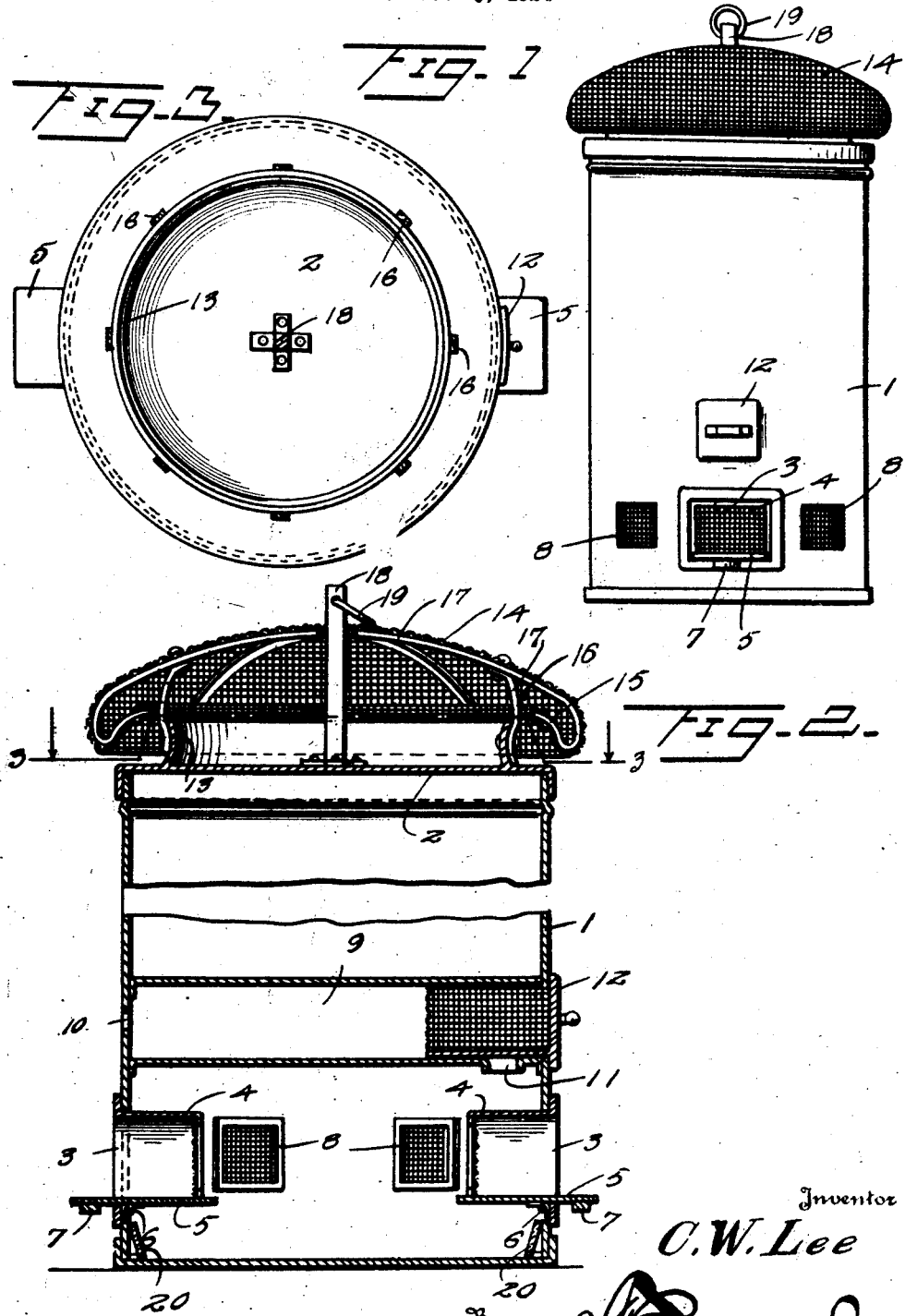

1,597,236

UNITED STATES PATENT OFFICE.

CONNIE W. LEE, OF PADUCAH, KENTUCKY.

COMBINED TRAP AND GARBAGE CAN.

Application filed October 9, 1924. Serial No. 742,687.

The present invention provides a receptacle for garbage and a trap for rodents and insects, such as rats, mice, flies, roaches, fleas, etc., the garbage constituting the bait and the adjuncts forming means for entrapping the animals and insects, which are subsequently disposed of in any preferred way.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is an elevational view of a combined garbage can and trap embodying the invention;

Figure 2 is an enlarged vertical central sectional view of the device, and

Figure 3 a horizontal sectional view on the line 3—3 of Figure 2.

Corresponding and like parts are referred to in the following description and designated in the several views of the drawings by like reference characters.

The numeral 1 designates the body of the can which may be of any usual construction and which is closed at its top by means of a cover 2. In accordance with the present invention one or more openings 3 are formed in the sides of the can adjacent the bottom thereof and guards 4 project inwardly from the sides of the can in line with the respective openings 3, said guards being closed at their top, sides and back and open at the front and bottom. A platform 5 normally closes the bottom of each of the guards 4 and is hinged to the body of the can in line with the bottom of the openings 3 as indicated at 6, said platform being weighted at its outer end as indicated at 7 and which end projects to facilitate the entrance of an animal such as a rat or mouse when about to go into the can to partake of the contents. The platform 5 normally closes against the bottom of the guard 4 and tilts downwardly under the weight of the animal which is precipitated into the can, the platform immediately closing when relieved of the weight of the animal thereby preventing escape thereof after being entrapped. Screened openings 8 are provided in the sides of the can to assist materially in enticing animals and insects.

An enclosed chamber 9 is disposed within the can some distance from the bottom thereof and this chamber extends from one side to the other of the body and is attached thereto in any preferred way. A small opening 10 is formed in a side of the can opposite an end of the chamber 9 and provides an entrance for roaches and like insects. An opening 11 is formed in the bottom of the chamber 9 adjacent the opposite end and provides a discharge for the entrapped insects as they are brushed from the chamber into the lower portion of the can. An opening is formed in the side of the can in line with the chamber 9 and a drawer 12 is slidable through said opening into an end portion of the chamber 9 and normally closes the opening and the opening 11 and this drawer provides for the use of a poisonous gas or other means for destroying the entrapped animals and insects.

The cover 2 is provided upon its top side with an upstanding rim 13 which forms a receptacle 14 for receiving flies and other insects such as fleas. A screen top 15 extends over the receptacle 14 and its outer edge portion is curved inwardly and upwardly and encircles the rim 13.

A flared space is formed between the parts 13 and 15 and this space is constricted at its top and opens as indicated at 16 to provide an entrance for flies and other insects when passing upwardly through the flared space into the trap which is comprised between the walls of the receptacle 14 and the screen top 15. Stays 17 reinforce and brace the screen top 15 and form connecting means with the receptacle. A centrally disposed upright 18 attached at its lower end to the cover 2 and having the braces 17 connected to its upper portion projects beyond the top 15 and is provided with a ring 19 which enables the cover to be conveniently handled.

To further entice a rat or other animal into the trap a mirror 20 is placed therein in such a position that when the animal approaches either entrance it sees the reflection of itself in the mirror and mistaking such reflection for another animal within the trap is not inclined to hesitate to enter. As stated herein the entrances 3 are opposite and for convenience a mirror 20 is placed beneath each of the entrances and against the inner side of the can, thereby insuring an animal approaching one of the entrances to see its reflection in the mirror adjacent the opposite entrance. Moreover by locating the mirrors beneath the entrances 3 the guards 4 form a protection therefor.

What is claimed is:—

A garbage can provided with a cover having an upstanding rim on the top thereof, a screen top extending over the receptacle and having its outer portion curved inwardly and upwardly to encircle the rim applied to the top of the cover, the space formed between said rim and the inwardly and upwardly curved portion of the top being flared and having an opening at the top to provide an entrance for flies and other insects, and braces for strengthening and reinforcing the screen top and forming connecting means between it and the cover of the can.

In testimony whereof I affix my signature.

CONNIE W. LEE.